US006487680B1

(12) United States Patent
Skazinski et al.

(10) Patent No.: US 6,487,680 B1
(45) Date of Patent: Nov. 26, 2002

(54) SYSTEM, APPARATUS, AND METHOD FOR MANAGING A DATA STORAGE SYSTEM IN AN N-WAY ACTIVE CONTROLLER CONFIGURATION

(75) Inventors: Joseph G. Skazinski, Berthoud (CO); Noel S. Otterness, Boulder (CO)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/454,277

(22) Filed: Dec. 3, 1999

(51) Int. Cl.[7] .................................................. G06F 11/16
(52) U.S. Cl. ............................ 714/23; 714/42; 714/55
(58) Field of Search ................................. 714/23, 5, 11, 714/51, 55, 4, 42, 748, 749, 9

(56) References Cited

U.S. PATENT DOCUMENTS

| 5,546,535 | A | * | 8/1996 | Stallmo et al. ................ 714/42 |
| 5,553,230 | A | * | 9/1996 | Petersen et al. ................ 714/1 |
| 5,699,510 | A | * | 12/1997 | Petersen et al. ................ 714/42 |
| 5,768,623 | A | * | 6/1998 | Judd et al. ..................... 710/17 |
| 5,841,969 | A | * | 11/1998 | Fye .............................. 714/51 |
| 5,975,738 | A | * | 11/1999 | DeKoning et al. ............ 700/79 |
| 5,996,075 | A | * | 11/1999 | Matena ......................... 713/200 |
| 6,035,416 | A | * | 3/2000 | Abdelnour et al. ........... 714/10 |
| 6,038,681 | A | * | 3/2000 | Saegusa ........................ 714/30 |
| 6,345,368 | B1 | * | 2/2002 | Bergsten ...................... 707/204 |
| 6,401,170 | B1 | * | 6/2002 | Griffith et al. ............... 711/114 |

* cited by examiner

*Primary Examiner*—Robert Beausoleil
*Assistant Examiner*—Yolanda Wilson

(57) ABSTRACT

The present invention provides a system, apparatus, and method for managing a data storage system in n-way active controller configuration, such that a controller can detect the failure of and reset more than just a single other controller. To accomplish this, a controller sends a ping message to at least a subset of the other controllers, and waits for any of the other controllers to respond to the ping message within a first predetermined amount of time. If any of the other controllers do not respond to the ping message within the first predetermined amount of time, it is determined that the non-responding controller has failed. The controller will reset any failed controller.

35 Claims, 12 Drawing Sheets

(STATE OF THE ART)

```
┌─────────────────────────────────────────┐
│      CONTROLLER PROFILE (CP) 182-X      │
│  ┌───────────────────────────────────┐  │
│  │      CONTROLLER IDENTIFICATION    │  │
│  │               192-X               │  │
│  ├───────────────────────────────────┤  │
│  │      CONTROLLER CONNECTIONS       │  │
│  │               194-X               │  │
│  │      ┌──────────────────────┐     │  │
│  │      │    CHANNEL STATE     │     │  │
│  │      │        196-X         │     │  │
│  ├──────┴──────────────────────┴─────┤  │
│  │         PING MSG SENT             │  │
│  │              198-X                │  │
│  ├───────────────────────────────────┤  │
│  │        PING MSG RECEIVED          │  │
│  │              200-X                │  │
│  ├───────────────────────────────────┤  │
│  │         CONTROLLER STATE          │  │
│  │              202-X                │  │
│  ├───────────────────────────────────┤  │
│  │              LINK                 │  │
│  │              184-X                │  │
│  └───────────────────────────────────┘  │
└─────────────────────────────────────────┘
```

FIG. 6

SYSTEM, APPARATUS, AND METHOD FOR MANAGING A DATA STORAGE SYSTEM IN AN N-WAY ACTIVE CONTROLLER CONFIGURATION

FIELD OF THE INVENTION

This invention relates generally to data storage systems. More particularly, the invention relates to the management of a data storage system by multiple disk array controllers in an n-way active configuration, such that a disk array controller can detect the failure of and reset one or more other disk array controllers in the data storage system.

BACKGROUND OF THE INVENTION

Disk drives in all computer systems are susceptible to failures caused, for example, by temperature variations, head crashes, motor failure, controller failure, and changing supply voltage conditions. Modem computer systems typically require, or at least benefit from, a fault-tolerant data storage system, for protecting data in the data storage system against any instances of data storage system component failure. One approach to meeting this need is to provide a redundant array of independent disks (RAID) operated by a disk array controller (controller).

A RAID system typically includes a single standalone controller, or multiple independent controllers, wherein each controller operates independently with respect to the other controllers. A controller is generally coupled across one or more input/output (I/O) buses both to a rack of disk drives and also to one or more host computers. The controller processes I/O requests from the one or more host computers to the rack of disk drives. Such I/O requests include, for example, Small Computer System Interface (SCSI) I/O requests, which are known in the art.

Such a RAID system provides fault tolerance to the one or more host computers, at a disk drive level. In other words, if one or more disk drives fail, the controller can typically rebuild any data from the one or more failed disk drives onto any surviving disk drives. In this manner, the RAID system handles most disk drive failures without interrupting any host computer I/O requests.

Consider what would happen if a controller in a single controller system failed—the entire data storage system would become inoperable. And, although failure of a single controller in a data storage system that is being managed by multiple independent controllers will not typically render the entire RAID system inoperable, such a failure will render the tasks that were being performed by the failed controller, and/or those tasks scheduled to be performed by the failed controller, inoperable. In light of the above, it can be appreciated that it is not only desirable for a data storage system to reliably function in the instance that a disk drive failure occurs, but it is also desirable for the data storage system to reliably function with any type of failed component, including a failed controller.

To provide fault tolerance to a data storage system at a controller level, data storage systems managed by two controllers in dual active configuration were implemented. Referring to FIG. 1, there is shown data storage system 100 being managed by two controllers 102 and 104 in dual active configuration, according to the state-of-the-art. Controllers 102 and 104 are coupled across first peripheral bus 106, for example, an optical fiber, copper coax cable, or twisted pair (wire) bus, to a plurality of storage devices, for example, disk drives 108–112, in peripheral 114. Controllers 102 and 104 are also coupled across a second peripheral bus 116, for example, an optical fiber, copper coax cable, or twisted pair (wire) bus, to one or more host computers, for example, host computer 118.

From the viewpoint of controller 102, controller 104 is its partner controller, and from the viewpoint of controller 104, controller 102 is its partner controller. To determine when a partner controller has failed, controllers 102 and 104 are connected across ping cable 120. Each respective controller 102 and 104 is responsible for sending ping messages to the other controller 102 or 104 across ping cable 120.

Receipt of a ping message by a controller 102 or 104 from a partner controller 102 or 104, informs the receiving controller 102 or 104 that the partner controller 102 or 104 is alive, and not malfunctioning from a hardware problem or another problem. For example, when a particular controller 102 or 104 stops receiving ping messages from its partner controller 102 or 104 for a predetermined amount of time, the particular controller 102 or 104 determines that the partner controller 102 or 104, in some manner, has failed.

In the event that a controller 102 or 104 fails, the surviving controller 102 or 104 will take over the tasks that were being performed by the failed controller 102 or 104. Additionally, the surviving controller 102 or 104 will perform those tasks that were scheduled to be performed by the failed controller 102 or 104. Additionally, if the failure is of a type for which reset is an adequate solution, the surviving controller 102 or 104 will typically attempt to reset the failed controller 102 or 104 by sending it a reset signal across a reset line 122. Such reset signals are known. (It can be appreciated that, in some instances, the failed controller 102 or 104 may require replacement or repair so that a reset by a surviving controller 102 or 104 may be inadequate.)

Consider that the failure of both controllers 102 and 104 would destroy the fault tolerance and functionality of data storage system 100. It would be advantageous and desirable to manage a data storage system with more than two controllers (as in the above described dual active controller configuration), such that at least two controllers could fail before such fault tolerance and functionality of a data storage system is destroyed.

A significant problem with the state of the art, is that it does not provide any system, structure or method for a controller 102 or 104 to detect the failure of, or reset any controller 102 or 104 other than a single partner controller 102 or 104. To illustrate this, consider that ping cable 120 and reset line 122 are hardwired between controllers 102 and 104, such that respective controllers 102 and 104 can only detect the failure of and reset a partner controller 102 or 104.

For more than two controllers to manage a data storage system in active controller configuration, each respective controller would require an ability to detect and reset more than just a single other controller. According to state of the art methodologies for detecting the failure of a partner controller 102 or 104, such a controller 102 or 104 would need to be implemented to accommodate more than just one respective ping cable and reset line to detect any failures and reset more than just a single other controller in the data storage system. The design and implementation of such a backplane would typically add additional expense to the cost of a controller and a data storage system. Additionally, significant manual intervention, by a human system administrator, may be required to add and connect such ping cables and reset lines between the controllers, possibly even necessitating the system to be shut-down during such intervention.

Therefore, there is a need for a data storage system that is managed by more than just two controllers in active controller configuration. There is a need for each controller in such a data storage system to be able to detect the failure of and reset more than just a single other partner controller in the data storage system. To accomplish this, it is desirable that such a controller will not require a redesign of the controller's backplane to accommodate an arbitrary number of ping cables and reset lines.

BRIEF DESCRIPTION OF THE DRAWINGS

For a better understanding of the nature and objects of the invention, reference should be made to the following detailed description taken in conjunction with the accompanying drawings, in which:

FIG. 6 is a block diagram illustrate aspects of an exemplary controller profile data structure 182, according to one embodiment of the present invention;

SUMMARY OF THE INVENTION

Figure 1:
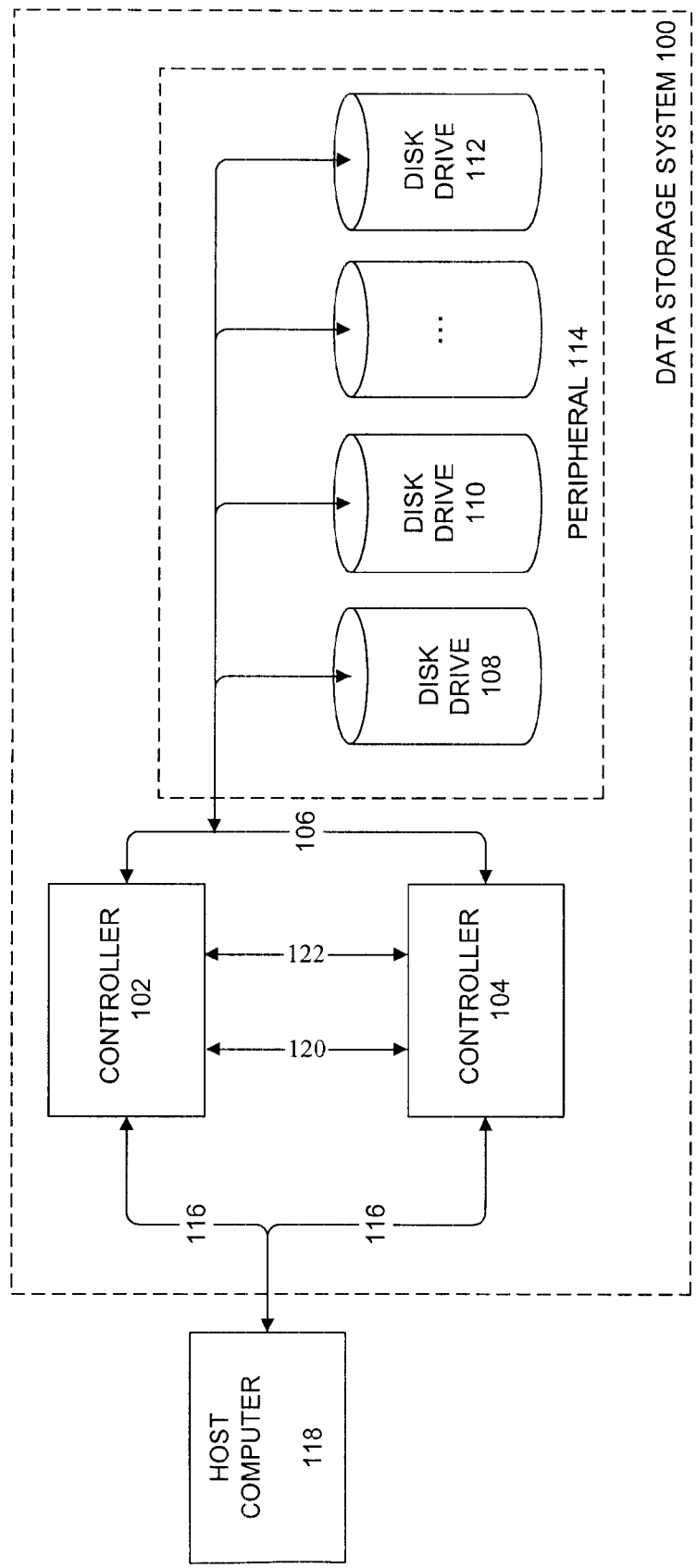
FIG. 1 is a block diagram illustrating a storage system managed by two controllers in dual active configuration, according to the state-of-the-art.

Heretofore, data storage systems managed in dual active controller configuration have had limited fault tolerance, because a controller could only detect the failure of and reset a single other controller, its partner controller. In such a data storage system, the failure of both controllers destroys the fault tolerance and data availability of the data storage system. This invention provides a system, structure, and method for multiple controllers (n), where n can be more than two, to manage a data storage system in an n-way active configuration, such that when n is greater than two, a controller can detect the failure of and reset more than just a single other controller.

The method of the present invention manages a data storage system in an n-way active controller configuration, by having each controller maintain a controller table data structure. Each controller table data structure includes at a set of controller profiles, each controller profile includes information associated with a respective different controller in the data storage system. A controller uses the information in its respective controller table data structure to communicate with each of the respective different controllers, such that an interruption of such communication with a particular controller for a first predetermined amount of time indicates to the controller that the particular controller has failed and needs to be reset. In this manner, a controller can detect the failure of and reset more than just a single other controller in the data storage system.

In yet another aspect, the apparatus of the present invention is a RAID controller that has a processor coupled to a memory that in turn, has a data structure and a first procedure defined therein. The data structure includes a controller table for storing, by the RAID controller, information associated with each of the other RAID controllers in the data storage system. The processor is used to execute the first procedure which sends a ping message to each of the active controllers identified in the data structure. Any RAID controller that does not respond to a respective ping message within a first predetermined amount of time from the sending of the respective ping message is determined to have failed. The RAID controller will reset any failed controller.

In yet another aspect, the apparatus will indicate to each of the other active RAID controllers not to send any ping messages to a failed controller. Additionally, a RAID controller that does not receive any ping message for a second predetermined amount of time from the receipt of a previous ping message, or from the time that it sent out a booting controller message, will reset itself.

DETAILED DESCRIPTION OF EMBODIMENTS OF THE INVENTION

The invention will now be described in detail by way of illustrations and examples for purposes of clarity and understanding. It will be readily apparent to those of ordinary skill in the art in light of the teachings of this invention that certain changes and modifications may be made thereto without departing from the spirit or scope of the appended claims. Section headings are provided for convenience and are not be construed as limiting the disclosure, as all various aspects of the invention are described in the several sections.

A. Exemplary System Level Description

Figure 2:
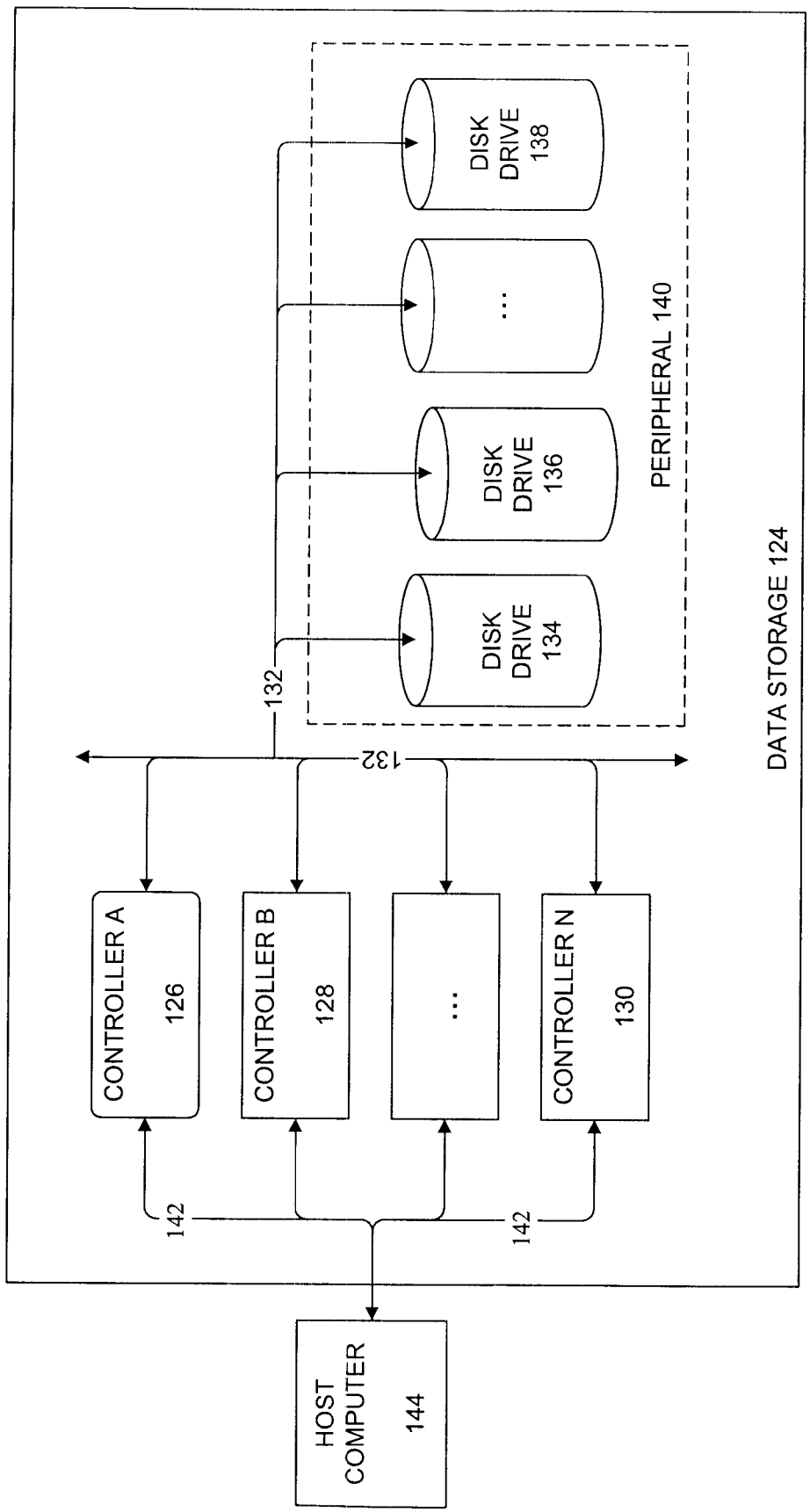
FIG. 2 is a block diagram illustrating aspects of an exemplary data storage system managed by multiple controllers (not limited to two controllers) in n-way active configuration, according to one embodiment of the present invention.

Referring to FIG. 2, there is shown a block diagram illustrating aspects of an exemplary data storage system 124, according to one embodiment of the present invention. Controllers 126–130 are connected across a first I/O bus 132, for example, an optical fiber, copper coax cable, or twisted pair (wire) bus, to a plurality of data storage devices. Such data storage devices include, for example, disk drives 134–138, in peripheral 140. Controllers 126–130 are also coupled across a second I/O bus 142 to one or more host computers, for example, host computer 144. I/O bus 142 can be, for example, an optical fiber, copper coax cable, or twisted pair (wire) bus.

Controllers 126–130 may be embodied either as separate plug-in adapter cards in one or more host computers 144 (as is the case with most general-purpose computer systems), or may respectively be integrated into host computer's 144 motherboard. Alternatively, each controller 126–130 may be respectively disposed as a separate external controller unit.

Figure 7:
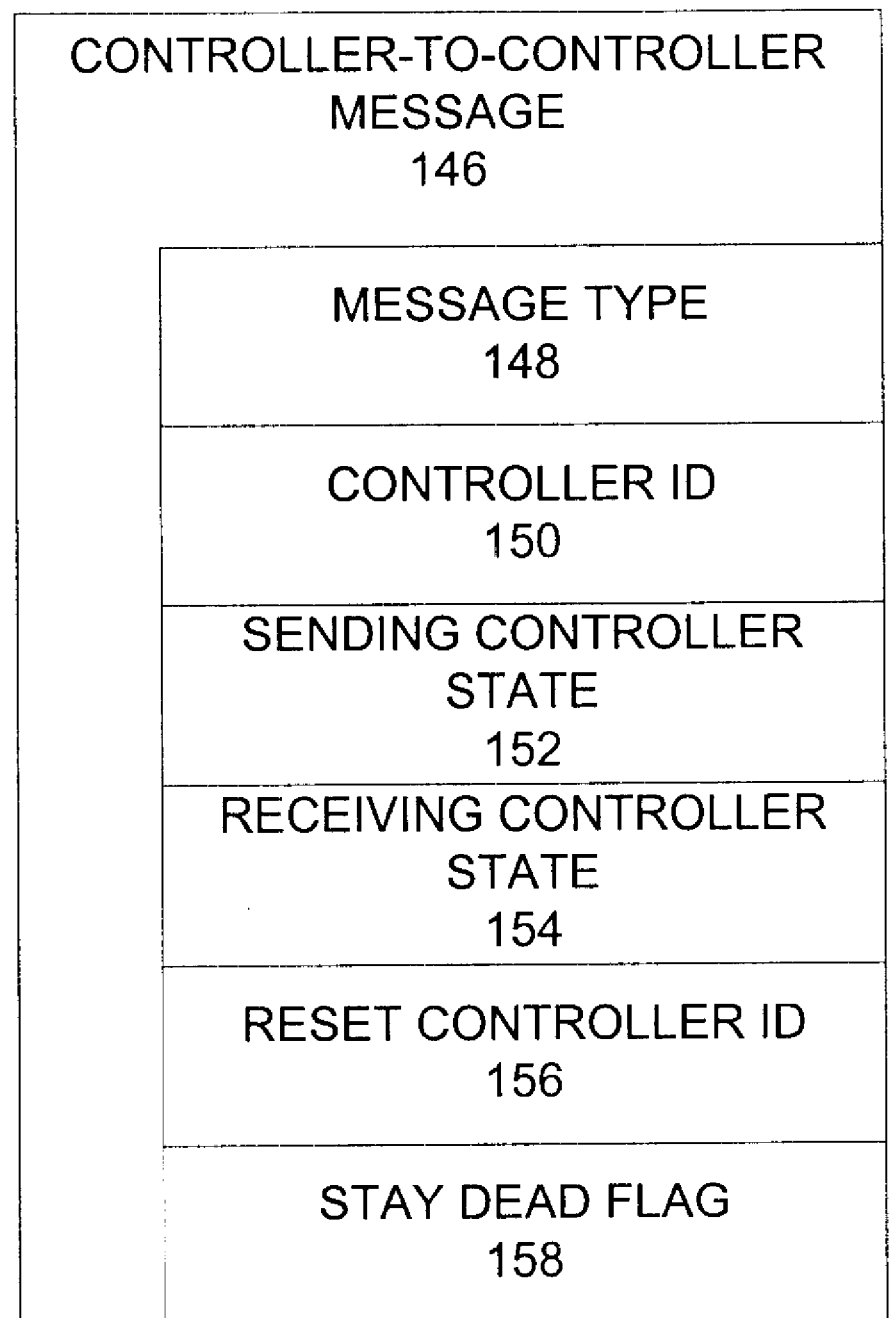
FIG. 7 as a block diagram illustrating aspects of an exemplary controller-to-controller message 146, according to one embodiment of the present invention.

Controllers 126–130 use I/O bus 132 as a communication path for controller-to-controller messages 146 (see FIG. 7). (Such controller-to-controller messages 146 are discussed in greater detail below in reference to FIG. 7.) Through the use of I/O bus 132 to send such controller-to-controller messages 146, a controller 126–130 can use a set of novel procedures to detect the failure of one or more other controllers 126–130 without using hardwired ping cables and a reset lines, as are required by the state-of-the-art. (Such novel procedures will be described in greater detail below in reference to n-way ping procedure 160 as illustrated in FIGS. 3, 7–11). Moreover, through use of I/O bus 132 to send such controller-to-controller messages 146, a controller 126–130 can also detect the failure of itself.

B. Exemplary Apparatus Level Description

Figure 3:
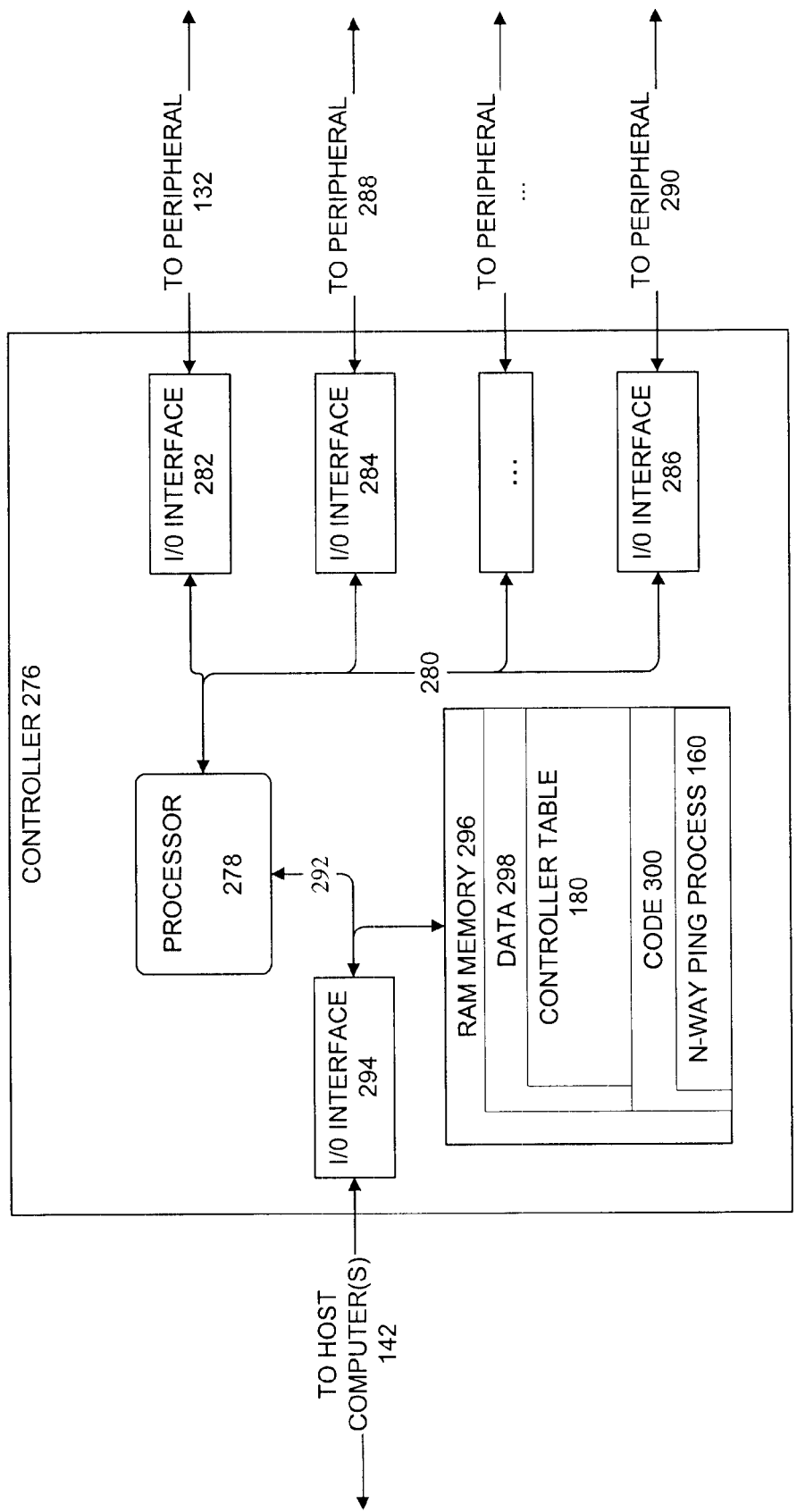
FIG. 3 is a block diagram illustrating aspects of an exemplary controller, for managing a data storage system in n-way active configuration, according to one embodiment of the present invention.

Referring to FIG. 3, there is shown a block diagram illustrating aspects of an exemplary controller 276, according to one embodiment of the present invention. The structure and operation of controller 276 can be used in conjunction with any one of controllers 126–130, as illustrated in the embodiments of FIG. 2.

Controller 276 includes a processor 278 that is coupled across a first local bus 292 to I/O interface 294, for bridging between first local bus 292 and first I/O bus 142. Processor 278 is also coupled across a second local bus 280 to one or more other I/O interfaces, such as, for example, I/O interfaces 282–286, for bridging between the second local bus 280 and one or more I/O buses 132, 288, and 290. Such I/O interfaces 282–286 are known.

First and second local buses 292 and 280 can be any type of local bus including, but not limited to, a peripheral component interconnect (PCI) bus, and industry standard architecture (ISA) bus, extended industry standard architecture (EISA) bus, Micro channel architecture, and the like.

I/O bus 142 is coupled to one or more host computers. I/O buses to 132, 288 and 290 are coupled to one or more peripherals containing one or more data storage devices. Each respective I/O bus 142, 132, 288, and 290 can be, for example, an optical fiber, copper coax cable, or a twisted pair (wire) bus.

Processor 278 is operatively coupled across first local bus 292 to random access memory (RAM) 296, which may be either internal or external to controller 276. Processor 278 stores data in data 298, and executes procedures stored in code 300. For example, processor 278 stores controller table 180, in data 298, and executes n-way ping procedure 160 in code 300. Each of controller table 180 and n-way ping procedure 160 are discussed in greater detail above.

To provide a controller 126–130 (see FIG. 2) that is managing a data storage system 124 in n-way active controller configuration the ability to detect the failure of more than just a single partner controller 126–130, each controller 126–130 maintains one or more data structures in memory 296. An exemplary set of data structures used by each controller 126–130 to provide the structural elements a controller table 180, are discussed in greater detail below in reference to the Exemplary Software Data Structures section, and as illustrated below in Tables 1–4.

In a preferred embodiment, controller 276 may be implemented using firmware customization (enhancements) to: (a) a DAC960 series of controllers, such as the RAID controller made by Mylex™ of Fremont, Calif.; (b) processor 310 is a 32-bit Intel i960, or a strong ARM RISC microprocessor with multitasking functionality; and, (c) local buses 292 and 280 are PCI buses.

C. Exemplary Procedural Description

Figure 4:
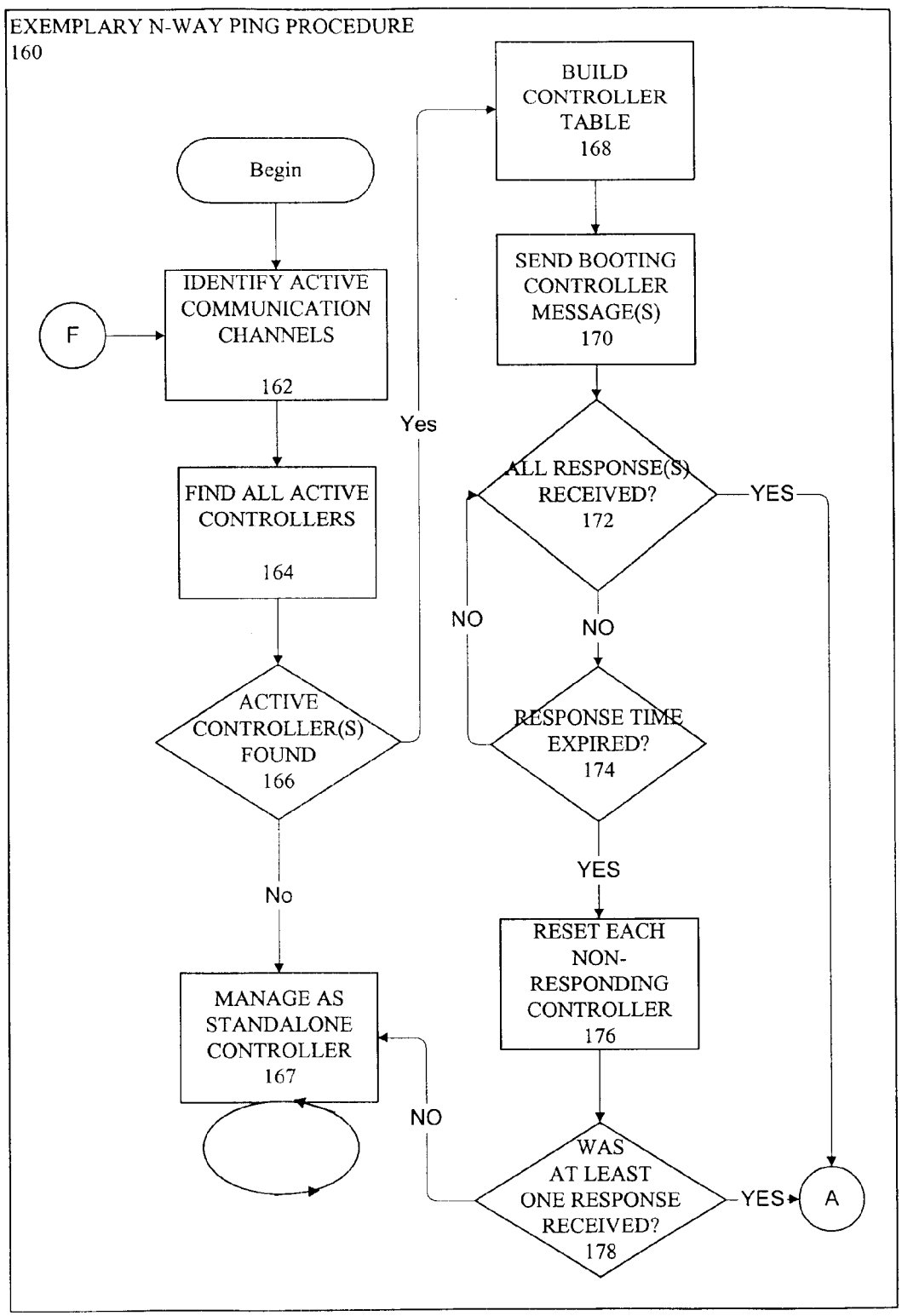
FIG. 4 is a flowchart illustrating aspects of an exemplary n-way ping process 160, according to one embodiment of the present invention.

Referring to FIG. 4, there is shown a flowchart illustrating aspects of an exemplary n-way ping procedure 160, according to one embodiment of the present invention. In the following n-way ping procedure 160 description, the components of data storage system 124 (see FIG. 2) are also referred to. As a controller, for example controller 128 is booted into data storage system 124, n-way ping procedure 160 enables the booting controller to detect and reset any controller 126–130 in the data storage system that has failed, including itself. (The structure of a controller 126–130 that includes a processor for executing n-way ping procedure 160, and a memory for storing n-way ping procedure 160, is discussed in greater detail below in reference to FIG. 3).

Step 162 identifies any active I/O buses 132 (communication channels) that are connected to a booting controller 126–130. To accomplish this, the booting controller 126–130 sends a test message across one or more I/O buses 132. An active I/O bus is one that: (a) is connected to the booting controller as well as to one or more of any other controllers and a plurality of disk storage devices; and, (b) one that is capable of transmitting messages between the booting controller and any other controllers and the plurality of disk storage devices.

To accomplish this, booting controller 126–130 sends a SCSI Test Unit Ready ("TUR") message across I/O bus 132 to determine if I/O bus 132 is active. (TUR messages are known, and for that reason, are not discussed in greater detail herein). Upon receipt, by a SCSI device, of such a test message, the SCSI device sends the booting controller 126–130 one good status message for each respective active LUN in the SCSI device. (Such good status messages are known, and for that reason, are not discussed in greater detail herein). Such good a status message(s) is sent to the booting controller 126–130 across each respective I/O bus 132 that the test message was received on. Receipt, by the booting controller 126–130, of such a good status across a respective I/O bus 132, indicates that the respective I/O bus 132 is active.

Step 164 identifies each SCSI device that is an active controller 126–130. To accomplish this, the booting controller 126–130 sends an inquiry message across each I/O bus 132 to each LUN that was identified by the receipt of the one or more good status messages (step 162). In one embodiment, the inquiry command is a SCSI Inquiry Command. The SCSI Inquiry Command is known and for that reason is not discussed in greater detail herein.

A LUN, in response to receiving such an inquiry command, will respond to the booting controller 126–130 with certain information, including, for example, a unique SCSI or loop ID, and a specific device type. (Such responses to SCSI Inquiry Commands are known). Each respective device type is used to determine if the associated LUN is a controller 126–130.

Step 166 determines if booting controller 126–130 found any other active controllers 126–130. The booting controller 126–130 accomplishes this by analyzing each response received, if any, to the inquiry command (step 164). Step 167 indicates that the booting controller 126–130 did not identify any other active controllers 126–130, and the booting controller 126–130 will manage the data storage system 124 as a stand alone controller. Even though the booting controller 126–130, at this point, is considered to be the only active controller 126–130 in the data storage system 124, other controllers 126–130 can be added, or activated into data storage system 124 according to these procedures 160.

Step 168 builds a controller table 180 (see FIG. 4) for the booting controller 126–130, because other active controllers 126–130 were found (step 166). As is discussed in greater detail below, each controller table 180 includes information associated with any other active controllers 126–130 in the data storage system 124. This information is used by the booting controller 126–130 to communicate with each of the other controllers 126–130 so that it can detect and reset any of the other controllers 126–130 that fail.

Figure 5:
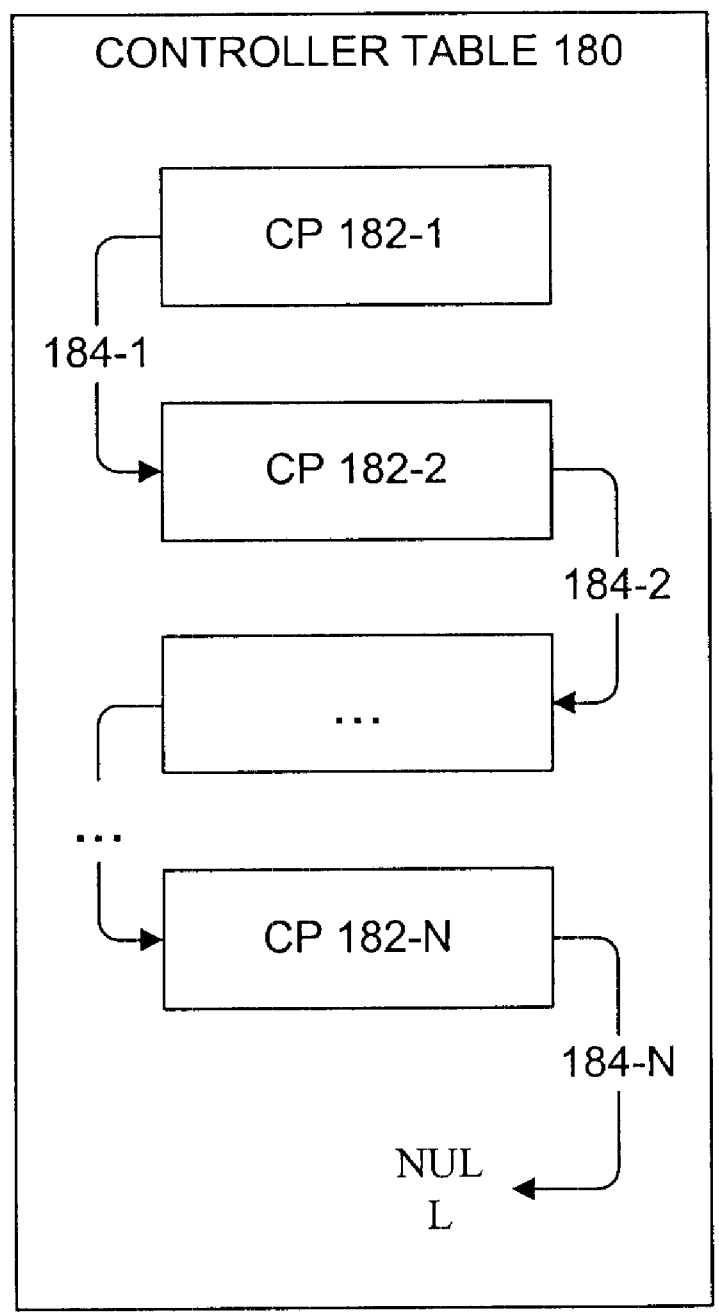
FIG. 5 is a block diagram illustrating aspects of an exemplary controller table data structure 180, for storing information associated with each controller that is managing a data storage system in n-way active controller configuration, according to one embodiment of the present invention.

Referring to FIG. 5, there is shown a block diagram illustrating aspects of an exemplary controller table 180, according to one embodiment of the present invention. Controller table 180 comprises a linked list of controller profile data structures ("CP") CP-182-X, for example, CP 182-1, CP 182-2, and CP 182-N. Each CP 182-X is associated, by a booting controller 126–130, with a different respective controller 126–130, and contains information associated with the different respective controller 126–130. Each CP 182-X references a next 182-X, if any, through the link 184-X.

For example, CP 182-1 references CP 182-2, through link 184-1, and the like. Because, CP 182-N is the last CP 182-X in the linked list, CI-182-N's link 184-N is empty, or NULL. It can be appreciated that controller table 180 can contain any number of CP 182-X data structures, limited only by the number of controllers 126–130 in the data storage system 124, and the amount of memory storage available to a controller 126–130. (An exemplary controller 126–130 structure, including memory used to store such a controller table 180, according to one embodiment of the present invention is discussed in greater detail below in reference to FIG. 3.)

Referring to FIG. 6, there is shown a block diagram illustrating aspects of an exemplary Controller Profile ("CP"), or CP 182-X data structure, according to one embodiment of the present invention. Each CP 182-X data structure includes, for example, the following structural elements:

Controller identification 192-X contains a unique controller ID. In one embodiment, each controller 126–130 has a controller ID that is a unique 32-bit unsigned integer value based on, for example, a Media Access Control (MAC) address scheme used in networking. Such MAC address schemes are known.

Controller connections 194-X is used by a controller to store information for determining which I/O buses 132 (see FIG. 2) a controller 126–130 would use to send controller-to-controller messages 146 (see FIG. 7), for example ping and reset messages (each of these message types are discussed in greater detail below).

Channel State 196-X is used by a controller to represent the fact that an I/O bus 132 can be in one of various states for use as a conduit for controller-to-controller messages to and from other controllers 126–130. Each of these channel states are discussed in greater detail below in reference to the Software Data Structure Architecture section of this description.

Ping Message Sent (Ping Msg Sent) 198-X is used by a controller to store a timestamp indicating a time when a last ping message was sent by a controller to a respective different controller.

Ping Message Received (Ping Msg Received) 200-X is used by a controller to store a timestamp indicating a time when a ping message response from an associated respective controller to a ping message, sent by the controller, was received by the controller.

Controller State 40-X is used by a controller to store an indication of a different controller's controller state Such controller states indicate, for example, whether a controller is currently booting-up into the data storage system, and, whether or not a controller is capable of processing I/O requests from a host computer, as well as whether the controller is capable of processing messages and commands from other respective controllers. Each of these controller states are discussed in greater detail below.

Link 184-X is used by a controller to store a pointer referencing a next CI-182-X data structure, if any, representing a different respective controller.

A set of exemplary data structures to embody aspects of controller table 180 are discussed in greater detail below in reference to the Software Data Structure Architecture section of this description (see also Tables 1–4).

Referring to FIG. 4, step 168 builds a controller table 180 by allocating a single CP 182-X data structure (see FIG. 6) for each respective controller 126–130 that responded to the inquiry message (step 164). For each CP 182-X, controller ID 192-X is set to equal a respective LUN ID of a respective different controller 126–130. For each I/O bus 132 (channel) that a particular controller 126–130 responded on, that particular channel's ID and an associated channel state 196-X of channel data ping (see line 7, table 1) is stored in an associated controller connections 194-X array element.

Step 170 sends, by the booting controller 126–130, a booting controller message to each of the identified controllers 126–130 (step 164) in the booting controllers controller table data structure 180 (FIG. 5). A booting controller message is a controller-to-controller message 146 (see FIG. 7) with certain elements 148–158 being used and set to specific values.

Referring to FIG. 7, there is shown a block diagram illustrating aspects of an exemplary controller-to-controller message 146, according to one embodiment of the present invention. Because controller-to-controller message 146 is used to embody a variety of different message types, message type 148 is set, by the controller 126–130 sending the controller-to-controller message 146, to a unique predetermined numerical value that is associated with the particular message type that is being sent. (Hereinafter, the controller 126–130 sending the controller-to-controller message 146 is referred to as the sending controller 126–130).

Such different message types include, for example, a booting controller message, a start controller message, a reset controller message, a kill controller message, and the like. Depending on the message type, certain elements 150–158 of controller-to-controller message 146 may not be used. Each of these message types are described in greater detail below as they are encountered in n-way ping procedure 160.

For example, a sending controller 126–130 sends a booting controller message by: (a) setting message type 148 (FIG. 4) to a unique value to indicates to a receiving controller 126–130 that the controller-to-controller message 146 is a booting controller message; and, (b) setting controller ID 150 is set to equal the booting controller's 128 SCSI or loop ID.

Although the remaining elements 152–158 are not necessarily used by a controller 126–130 sending a booting controller message, for purposes of completeness and proximity, the remaining elements 152–158 are now described. Sending controller state 152 is set to the controller state (see FIG. 6, controller state 202-X, and Table 3) of the sending controller 126–130. Receiving controller state 154 is set by the sending controller 126–130 to the controller state that the sending controller 126–130 believes the receiving controller 126–130 is in.

Reset controller ID is used by the sending controller 126–130 to indicate to other controllers 126–130 that a particular controller having a SCSI ID or loop ID equal to reset controller ID 156, should be killed. (A procedure for killing a controller 126–128 is discussed in greater detail below). Stay dead flag 158 is used by a sending controller 126–130 to keep a failed, or malfunctioning controller 126–130, from booting into the system 124. (Use of stay dead flag 158 is described in greater detail below in reference to FIG. 8, and step 206).

Referring back to FIG. 4 and step 170, in response to receiving a booting controller message by a respective receiving controller 126–130, the receiving controller 126–130 will first associate a CP 182-X (see FIG. 6) in the receiving controller's 126–130 table data structure 180 (see FIG. 5), with the booting controller 126–130. If the booting controller 126–130 was previously an active controller 126–130, a receiving controller 126–130 may already have a CP 182-X that is associated with the booting controller 126–130, in which case its status may be changed from, for example, failed, to booting. Any I/O bus 132 (see FIG. 2) that the booting controller message 146 is received on, indicates to a receiving controller 126–130, which communication channel(s) can be used to communicate with the booting controller 126–130.

Next, in response to receiving the booting controller message (see step 170), each receiving controller 126–130 will send a start controller message to the booting controller 126–130. A start controller message is a controller-to-controller message 146 (FIG. 7) with: (a) message type 148 set equal to a unique value that indicates that the controller-to-controller message 146 is a start controller message: (b) controller ID 150 is set to equal the respective responding controller's 126–130 controller ID; (c) sending controller state 152 is set to equal the respective responding controller's 126–130 controller state; and, (d) stay dead flag 158 is set to equal true ("1") if the responding controller 126–130 believes that the booting controller 126–130 has, for some reason, failed. Otherwise, stay dead flag 158 is set to equal false ("0"). (Use of stay dead flag 158 is described in greater detail below in reference to FIG. 8, and step 206).

Step 172 waits, by the booting controller 126–130, a first predetermined amount of time for at least a subset of the other controllers 126–130 to send a start controller message in response to the receipt of the booting controller message (step 170). The first predetermined amount of time is set to equal an amount of time sufficient for a controller 126–130 to respond to a controller-to-controller message 146. In one embodiment, the predetermined amount of time is between 50 milliseconds and 4000 milliseconds but may be greater. In a preferred embodiment, the first predetermined amount of time is 250 milliseconds.

Figure 8:
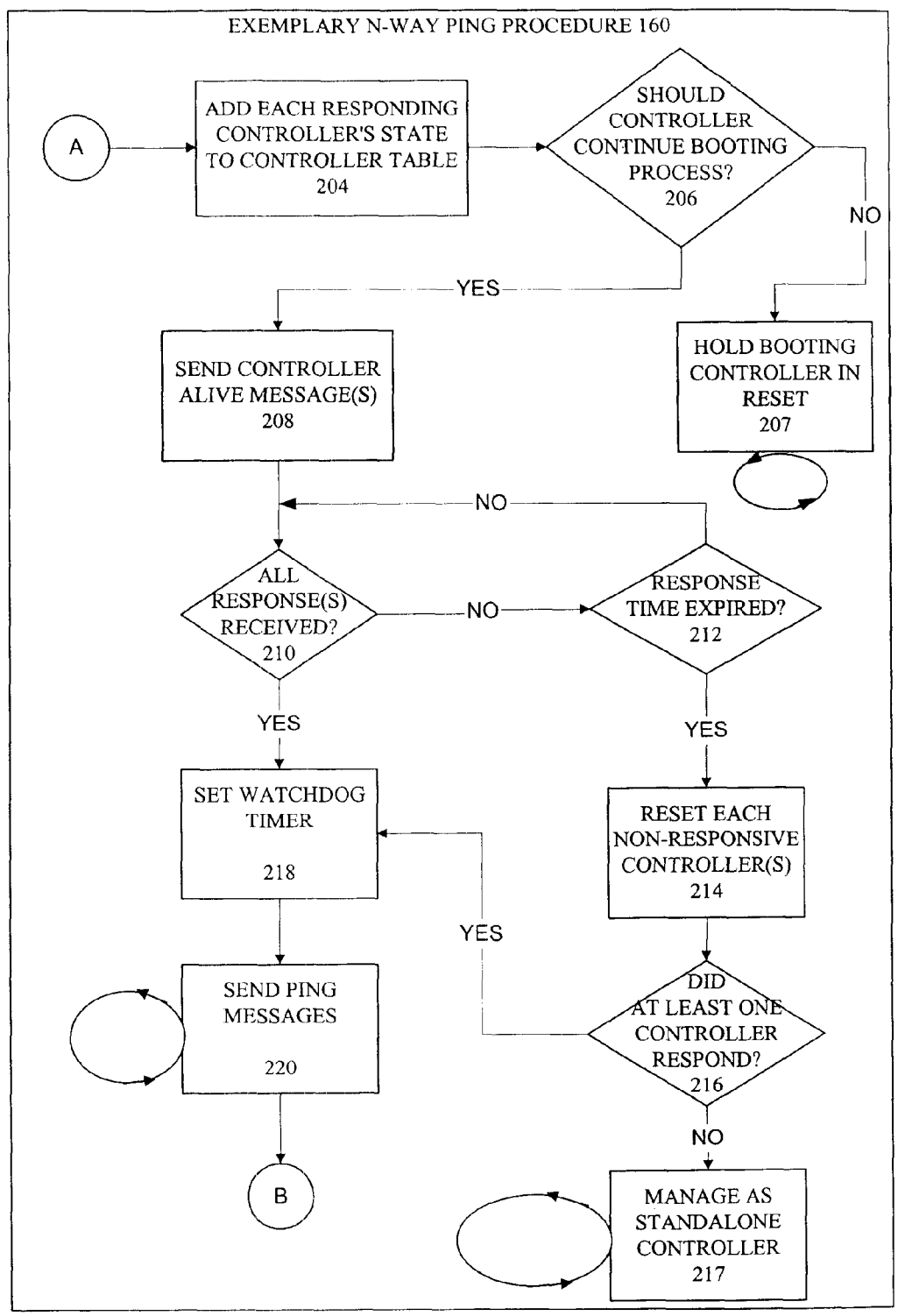
FIG. 8 is a flowchart illustrating aspects of an exemplary n-way ping procedure 160, according to one embodiment of the present invention.

When a respective start controller message has been received from all other controllers 126–130 identified in the booting controller's 128 controller table 180, step 172 continues the procedure 160 at "A" (see FIG. 8). Otherwise, step 174 determines if the first predetermined amount of time has expired since the execution of step 170.

If the first predetermined amount of time has expired since the execution of step 170, step 176: (a) resets, by the booting controller 126–130, each controller 126–130 that did not respond to the booting controller message (step 170); and (b) changes each respective non-responding controller's 130 state (see FIG. 6, 202-X) in the booting controller's 128 controller table 180, from controller active to controller failed. As a result, the booting controller 126–130 will not include the non-responding controller 126–130 in further n-way ping 160 procedures, such as, for example, those procedures discussed in greater detail below in reference to FIG. 8.

A controller 126–130 resets another controller by sending another controller 126–130, a reset message. A reset message is a controller-to-controller message 146 (see FIG. 7) with message type 148 set to a unique value that indicates that the controller-to-controller message 146 is a reset message. Upon receipt of a reset message, the receiving controller 126–130 will process an internal interrupt, such that n-way ping process 160 is executed again from the beginning (step 162), as discussed in greater detail above. Processing such internal interrupts are common in the art, and for this reason are not discussed in further detail herein.

As part of step 176, for each non-responding controller 126–130, the booting controller 126–130 sends each other active controller 126–130 that did respond to the booting controller message (step 170), a kill controller message. A kill controller message is a controller-to-controller message 146 where: (a) message type 148 equals a unique value that indicates that the controller-to-controller message 146 is a kill controller message; (b) controller ID 150 is equal the booting controller's 128 unique controller ID; and, (c) reset controller ID 156 is equal to the respective non-responding controller's 126–130 controller ID.

Receipt of a kill controller message indicates to a receiving controller 126–130 that the indicated non-responding controller (see reset controller ID 156) should be killed. To accomplish this, each receiving controller 126–130: (a) will change a non-responding controller's 126–130 associated controller status 202-X to failed; and, (b) will stop sending ping messages to the non-responding controller 126–130. As will be discussed in greater detail below in reference to FIG. 9 and step 224, a controller 126–130 that fails to receive a ping message from all other controllers 126–130 for a second predetermined amount of time from receipt of a previous ping message, will reset itself.

Step 178 determines if the booting controller 126–130 received at least one start controller message from another controller 126–130. If so, n-way ping process 160 continues at "A," as described in greater detail below in reference to FIG. 8. Otherwise, step 167 manages, by the booting controller 126–130, the data storage system 124 as a single controller 126–130.

Referring to FIG. 8, at step 204, the booting controller 126–130, for each controller 126–130 that responded to the controller booting message (step 170) stores each controller's controller state (see FIG. 4, sending controller state 152) into a corresponding controller state 202-X structural element (see FIG. 6) in controller table 180.

At step 206, the booting controller 126–130 determines if it should continue the n-way ping procedures 160, or whether it should hold itself in reset mode. As noted above, if stay dead flag 158 (see FIG. 7) is set to equal to true, the responding controller 126–130 believes that the booting controller 126–130 has, for some reason, failed (otherwise, stay dead flag 158 is equal to false). In this situation, the booting controller 126–130 will hold itself in reset mode. (Hereinafter, a controller 126–130 that is holding itself in reset is referred to as a reset mode controller 126–130).

A reset mode controller will not respond to host computer I/O requests, and will not continue with n-way ping process 160 unless it subsequently receives a start controller message 146 with stay dead flag equal to false. A controller that receives such a start controller message will begin executing at step 208.

At step 207, it having been determined that the booting controller 126–130 should stay dead (step 206), the booting controller 126–130 stops execution of n-way ping procedure 160, and holds itself in reset mode.

As noted above, a reset mode controller 126–130 will process a start controller message, and if stay dead flag 158 is false, the reset mode controller 126–128 comes out of reset mode and continues execution at step 208. (The specifics of a start controller message is discussed in greater detail above). Such a start controller message can originate from, for example, a human operator causing one to be sent to the reset mode controller 126–130, for example, through a controller configuration software computer program (not shown) that is executing on a host computer 144 (see FIG. 2).

At step 208, booting controller 126–130 sends a controller-to-controller message 146 (see FIG. 4) to each active controller that is identified in the booting controller's 128 controllertable 180, the controllermessage 146 indicating that the booting controller 126–130 is able to process host computer I/O requests and controller-to-controller 146 messages.

To accomplish this, in one embodiment: (a) message type 148 is set to equal a value that indicates to a receiving controller 126–130 that the controller-to-controller message 146 is a controller alive message; (b) controller ID 150 is set to equal the booting controller's 128 ID; and, (c) sending controller state 152 is set to a value that indicates a controller active state.

Receipt, by a controller 126–130, of such a controller alive message (step 208), causes a controller, to update the booting controller's 128 controller status (see FIG. 6, controller state 202-X) to controller active (see line 3, Table 3), from a previous status of controller booting (see line 6, Table 3).

From this point on, each respective controller 126–130 that received the controller alive message (step 208), at periodic predetermined time intervals, will send a ping message to the booting controller 126–130 that indicates to the booting controller 126–130 that the respective controller is alive and functioning properly. As discussed above, the predetermined time interval can be any amount of time as long as it can reasonably be used by a controller 126–130 to determine whether a different controller 126–130 has failed.

To illustrate a ping message according to one embodiment of the present invention, controller-to-controller message 146 message type 148 is set to a value indicating that the controller-to-controller message 146 is a ping message. Controller ID 150 is set to the sending controller's unique controller ID. Sending controller state 152 is set to equal the ping message sending controller's controller state. Receiving controller state 154 is set to equal the controller state (see FIG. 6, and Table 4) that the ping message sending controller 126–130 believes the ping message receiving controller 126–130 is in.

To illustrate aping message response according to one embodiment of the present invention, controller-to-controller message 146 message type 148 is set to a value indicating that the controller-to-controller message 146 is a ping message response. Controller ID 150 is set to the sending controller's unique controller ID. Sending controller state 152 is set to equal the ping message sending controller's controller state. Receiving controller state 154 is set to equal the controller state (see FIG. 6, and Table 4) that the sending controller 126–130 believes the ping message response receiving controller 126–130 is in.

Step 210 waits, by the booting controller 126–130, for a first predetermined amount of time for each controller 126–130 to respond the controller alive message (step 208) with a respective ping message.

At step 212, if no responses have been received (step 210), it is determined if the first predetermined amount of time has expired since sending a controller alive message (step 208), to each respective other controller 126–130.

In one embodiment, after the expiration of the first predetermined amount of time (step 212), step 208 and 210 are repeated one time, each time the first predetermined amount of time expires, for a retry count number of times. The retry count is selected such that a controller 126–130 has enough opportunity to respond to a controller-to-controller message 146, and can reasonably be considered to have failed, or malfunctioned in some manner. In this embodiment, retry count is set to equal three (3) retries.

At step 214, if the first predetermined amount of time has expired (step 212), the booting controller 126–130 resets each non-responding controller. This is accomplished according to the procedures discussed in greater detail above in reference to FIG. 4 and step 176.

Step 216 determines whether at least one other controller 126–130 responded to the controller alive message (step 208). At step 217, if no other controller responded (step 216), then booting controller 126–130 manages the data storage system 124 as a standalone controller.

At step 218, if at least one other controller 126–130 responded (step 216), the booting controller 126–130 sets a watchdog timer, to indicate the amount of time that has elapsed since the controller 126–130 last received aping message from another controller 126–130. The watchdog timer enables a controller 126–130 to self-determine whether it may have failed, because it has not received any ping messages for the second predetermined amount time from the receipt of a previous ping message. Because a controller 126–130 has a processor that executes at a predetermined clock speed (as will be illustrated in greater detail below in reference to FIG. 3), a watchdog timer can be implemented using computer programming techniques that are known in the art of computer programming.

Step 220 sends, by the booting controller 126–130, ping messages to each other active controller 126–130 that is identified in the booting controller's 128 controller table 180. Booting controller 126–130 is now receiving respective ping messages from any other controllers 126–130, because each other active controller 126–130 will have added information associated with the booting controller 126–130 into a respective controller tables 180. In this manner, each controller 126–130 in the data storage system 124 is exchanging controller-to-controller messages 146, including, ping messages and reset messages over an I/O bus 132, such that a controller 126–130 has the ability to detect the failure of and reset more than just a single other controller 126–130.

Figure 9:
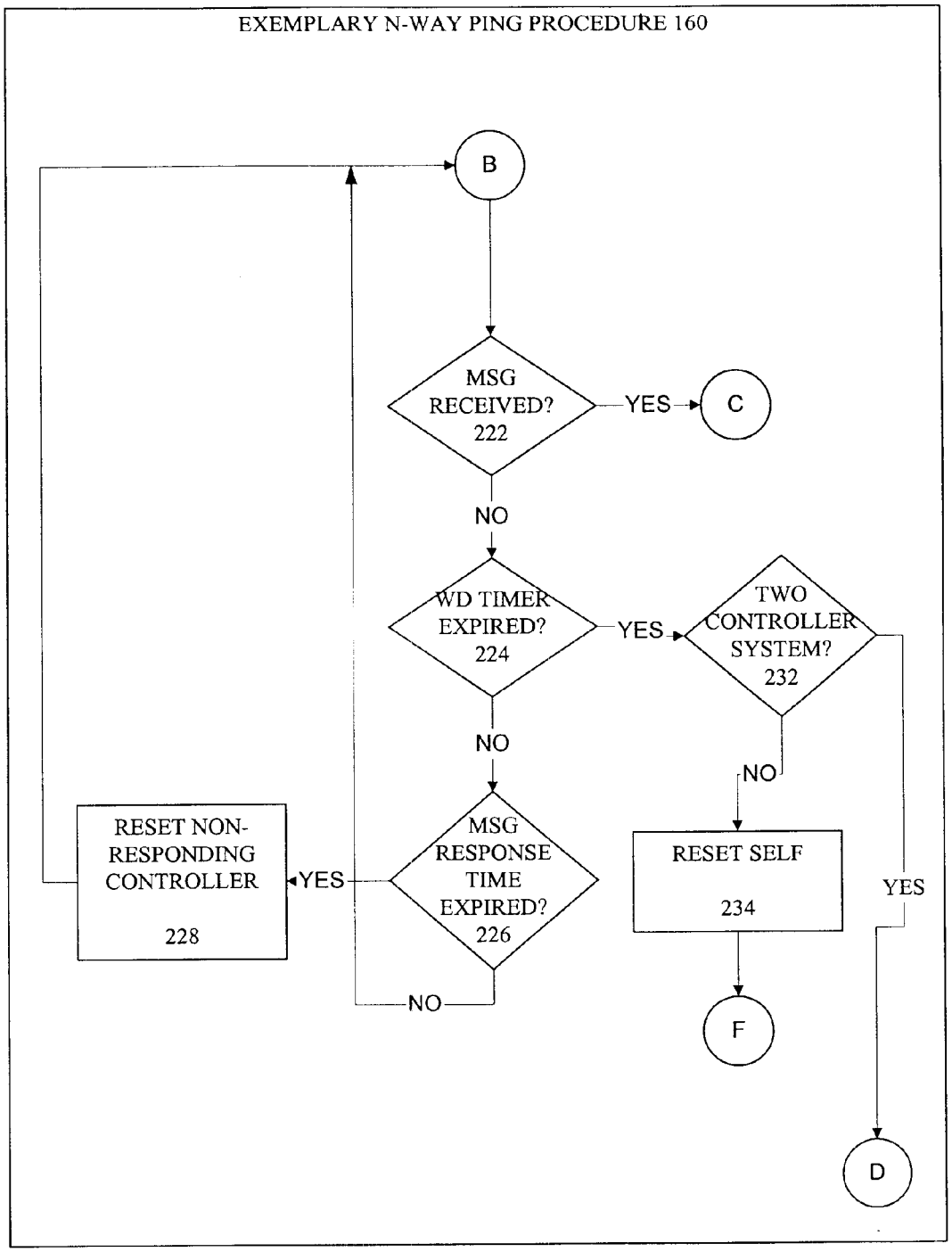
FIG. 9 is a flowchart illustrating aspects of an exemplary n-way ping procedure 160, according to one embodiment of the present invention.

Referring to FIG. 9, there is shown a flowchart illustrating aspects of an exemplary n-way ping procedure 160, according to one embodiment of the present invention. N-way ping procedure 160 continues at "B," where step 222 determines, by a controller 126–130, whether any controller-to-controller messages 146 have been received from any other controllers 126–130. If so, processing continues at "C," as will be described in greater detail below in reference to FIG. 10.

Step 224 determines, by the controller 126–130, whether the watchdog timer (described above in reference to FIG. 8, step 218) has executed for a second predetermined amount of time since a ping message from another controller 126–130 has been received by the controller 126–130. In one embodiment, the second predetermined amount of time is at least 500 milliseconds and at most 4000 milliseconds. In a preferred embodiment, the second predetermined amount of time is 1000 milliseconds.

The watchdog timer having expired (step 224), step 232 determines if there are only two controllers in the system 124. This is determined, because if there are more than two controllers 126–130 in the data storage system 124, it is more likely that the controller 126–130 with the expired watchdog timer has failed, than it is likely that each of the other controllers 126–130 has failed.

If there are more than two controllers 126–130, step 234 resets the controller 126–130 with the expired watchdog timer, such that it will execute n-way ping procedure 160 from the beginning, as discussed in greater detail above in reference to FIG. 4.

If the watchdog timer did not expire (step 224), step 226 determines, by a controller 126–130, whether the first predetermined amount of time has elapsed without receiving a ping message response from any one of the other controllers 126–130 identified in the controller's 126–130 respective controller table 180 (see FIG. 5). (The first predetermined amount of time is discussed in greater detail above). If so, the non-responding controllers 126–130 are considered to have failed or malfunctioned in some manner.

To accomplish this, a controller 126–130, upon sending a particular controller 126–130 a ping message, sets an associated ping sent time 198-X (see FIG. 6, see also Table 4) to the system clock time. (As noted above each controller 126–130 has a processor that maintains a clock speed). If any response the ping message is received from the particular controller 126–130, an associated ping received time 200-X (see FIG. 6, see also Table 4) is set to the system clock time. If the particular controller 126–130 does not respond within the first predetermined amount of time from the ping sent time 198-X, then the particular controller 126–130 is considered to have failed, or malfunctioned in some manner. (For purposes of simplifying this description, a "non-responding controller" 126–130 is a controller 126–130 that does not respond to a controller-to-controller message 146 (FIG. 4), such as, for example, a ping message, within the first predetermined amount of time from the time that the controller-to-controller message 146 was sent to the controller 126–130.

Step 228, resets, by the controller 126–130, any non-responding controller 126–130 as discussed in greater detail above in reference to step 176, FIG. 4. At this point, n-way ping procedure 160 continues at "B".

Figure 10:
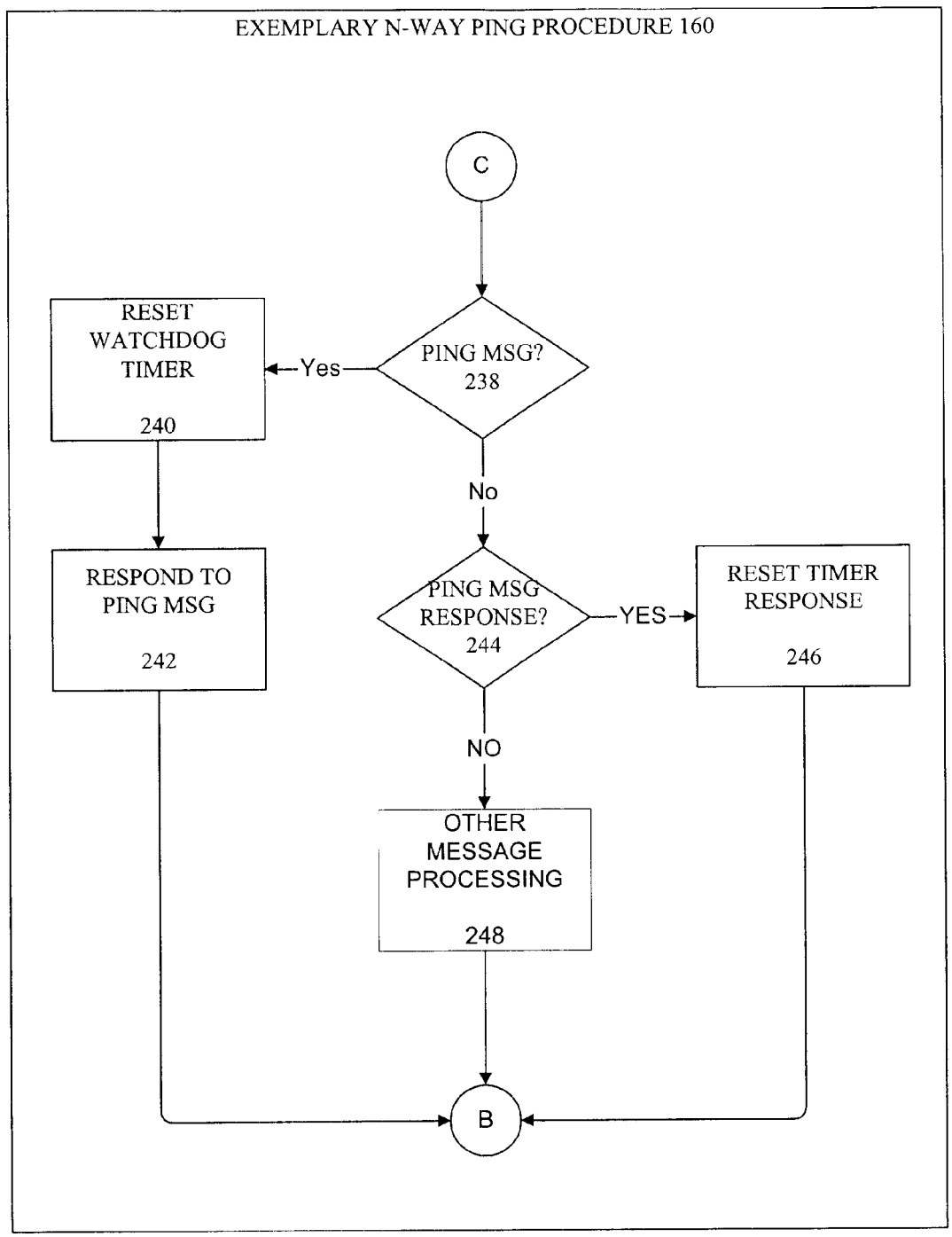
FIG. 10 is a flowchart illustrating aspects of an exemplary n-way ping procedure 160, according to one embodiment of the present invention.

Referring to FIG. 10, there is shown a flowchart illustrating aspects of an exemplary n-way ping procedure 160, according to one embodiment of the present invention. At step 238, a message having been received (step 222, FIG. 9), it is determined whether a ping message was received. If so, at step 240, the controller's 126–130 respective watchdog timer is reset to zero.

At step 242: (a) a ping message response is sent to the respective controller 126–130 that sent the ping message; and, (b) an indication marking the time that the ping message from the respective controller 126–130 was received is set to the current time. For example, refer to table 4, and ping msg received 200-X, FIG. 6.

Step 244 determines if the received message (step 222, FIG. 9) is ping message response sent from another controller. If so, step 246, sets, by ping message response receiving controller 126–130, an indication that the other controller 126–130 has responded to a ping message (step 220, FIG. 8) within the first predetermined amount of time.

In one embodiment, this is accomplished by setting ping message sent 198-X to a null value. Ping message sent 198-X indicates a time that this controller 126–130 sent the particular controller that responded, the ping message that corresponds to this ping message response. If it is equal to null, then this controller 126–130 will assume that it is not waiting for a corresponding ping message response from the other particular controller 126–130.

At step 248, other n-way ping procedures take place, the particular procedures depend upon the type of message received (step 222, FIG. 9). Such procedures include, for example, reset message processing, booting controller message processing, kill controller message processing, and the like. Each of these n-way ping procedures are discussed in greater detail elsewhere in this specification.

Figure 11:
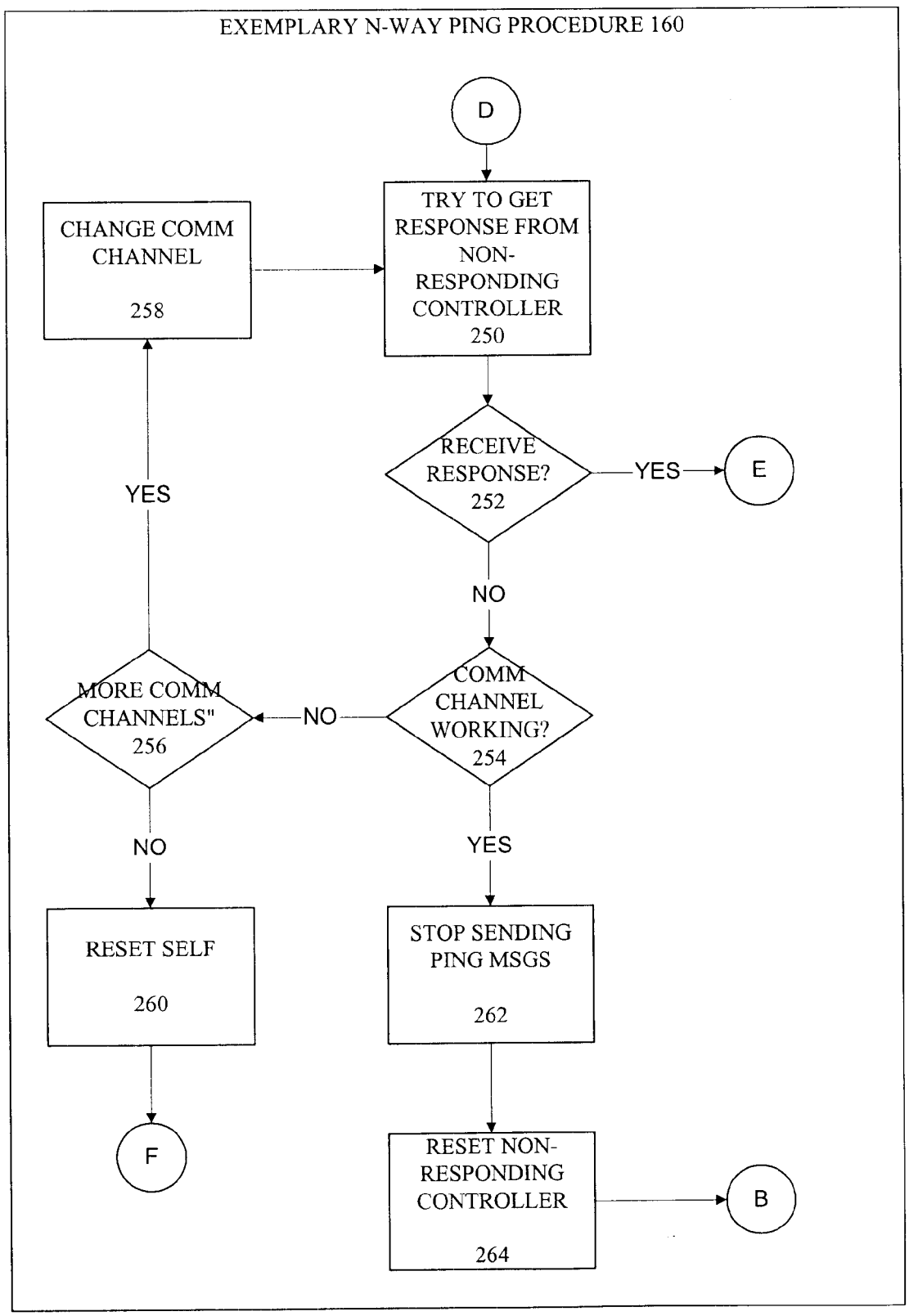
FIG. 11 is a flowchart illustrating aspects of an exemplary n-way ping procedure 160, according to one embodiment of the present invention.

Referring to FIG. 11, there is shown a flowchart illustrating aspects of an exemplary n-way ping procedure 160, according to one embodiment of the present invention. At step 250, it having been determined that there are only two controllers 126–130 in the system 124 (step 232, FIG. 9), a controller 126–130 attempts to establish communications with the non-responding controller 126–130. In one embodiment, this is accomplished by sending a ping message to the non-responding controller 126–130.

At step 252, it is determined whether a response to the attempt to communicate with the non-responding controller 126–130 (step 250) was received. In one embodiment, as discussed in greater detail above, a controller 126–130 will wait for a first predetermined amount of time to receive such a response.

At step 254, a response having not been received, the particular I/O bus 132 that was used to communicate with the non-responding controller 126–130 is tested to determine if it is functioning properly.

In one embodiment, this is accomplished by a controller 126–130 sending an inquiry message to the non-responding controller 126–130. The inquiry message can be any message, as long as the receiving controller responds to the message with a status indicating that the message was received, indicating that the communication channel is properly functioning. As discussed in greater detail above in reference to FIG. 4, in one embodiment, the inquiry message is a standard SCSI inquiry message.

At step 256, it having been determined that the particular I/O bus 132 was not functioning properly (step 254), it is determined if there are other I/O buses 132 by which communications to the non-responding controller 126–130 can be attempted by this controller 126–130.

In one embodiment, a controller table 180 (see FIG. 5) contains this information, for example, in a controller connections 194-X data structure (see FIG. 6 and Table 4). If there is more than one I/O bus 132 identified in the respective controller connections 194-X data structure, a different I/O bus 132 is selected as a conduit for communications with the non-responding controller 126–130, and the procedure continues at step 250 (discussed in greater detail above).

At step 260, it having been determined that none of the I/O buses 132 were properly functioning (steps 254 and 256), controller 126–130 resets itself as discussed in greater detail above, to ensure that it is not the cause of the communication problems.

At step 262, it having been determined that a communication channel is functioning properly (step 254), controller 126–130 changes the non-responding controller's 126–130 status 202-X (see FIG. 6) from controller active to controller failed and stops sending ping messages to the non-responding controller 126–130.

At step 264, the non-responding controller 126–130 is reset as discussed in greater detail above (see step 176, FIG. 4). N-way ping procedure 160 continues at "B," as illustrated in FIG. 9.

Figure 12:
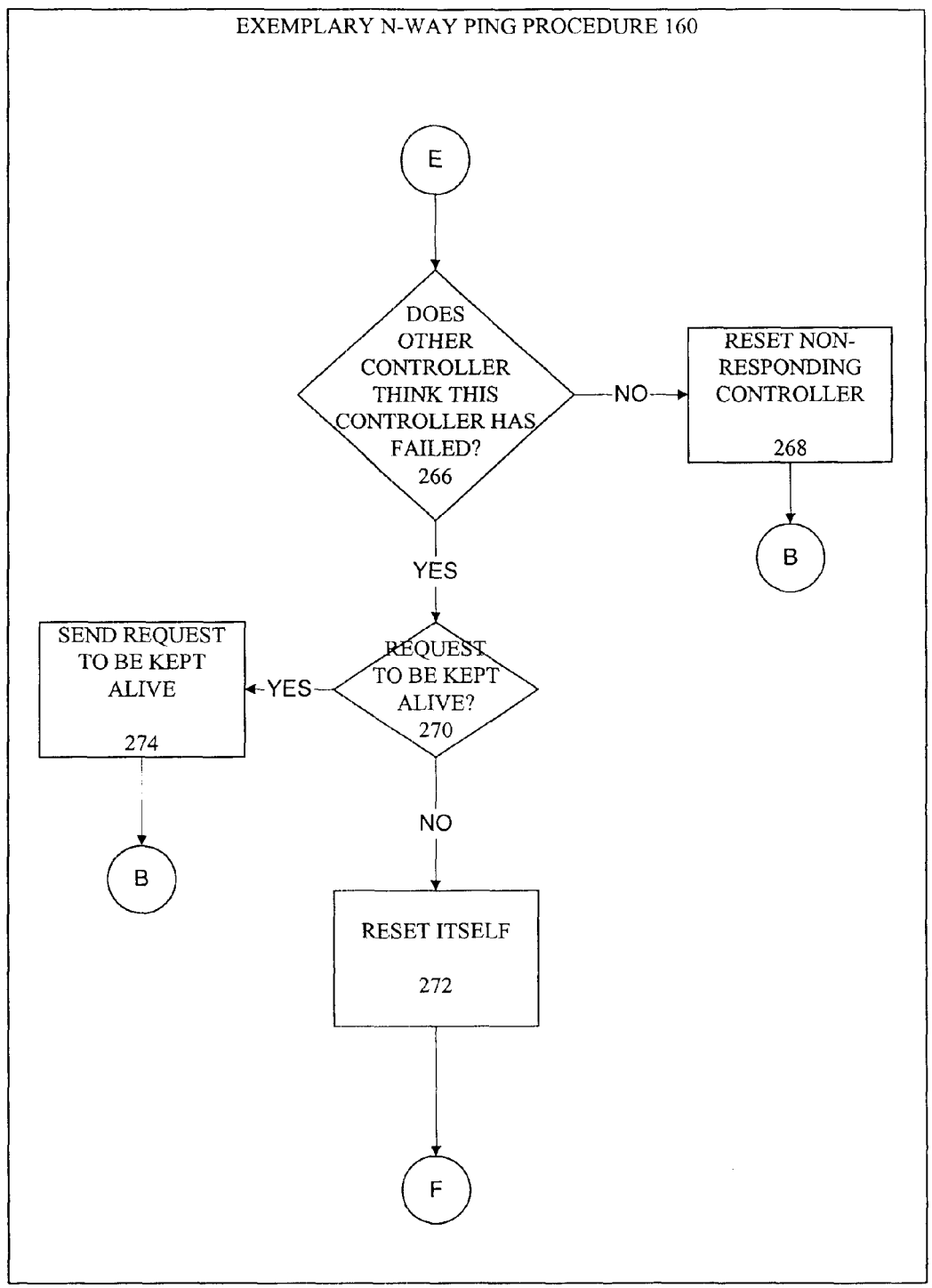
FIG. 12 is a flowchart illustrating aspects of an exemplary n-way ping procedure 160, according to one embodiment of the present invention.

Referring to FIG. 12, there are shown aspects of an exemplary n-way ping procedure 160, according to one embodiment of the present invention. At step 266, a response to a ping message having been received (step 252, FIG. 11), it is determined whether the ping message response indicates (see, stay dead flag 158, FIG. 4) that the non-responding controller 126–130 thinks that the sending controller 126–130 has a controller status of controller failed, as compared to the sending controller 126–130 having a controller status of controller active.

Step 270, determines, by the sending controller 126–130, whether it should make a request to be kept alive, because the non-responding controller indicates that it thinks that the sending controller 126–130 has failed (step 266)). (As noted above, upon detecting a failed controller 126–130, a controller 126–130 will reset the failed controller 126–130 and send a kill controller message to all other active controllers).

To determine whether such a request to be kept alive should be sent, each controller 126–130 maintains a request to be kept alive counter. The request to be kept alive counter ("counter") can be maintained in a memory 296 (see FIG. 3)). In one embodiment, the counter is initialized to a value of zero when the sending controller 126–130 boots-up, and is incremented by one each time that the sending controller 126–130 sends another controller 126–130 a request to be kept alive.

If the counter has a numerical value that exceeds a predetermined threshold ("threshold"), the controller 126–130 will reset itself (using procedures that were discussed in greater detail above). In one embodiment, threshold is set to equal a value such that a controller 126–130 that is not operating properly does not tie up a communication channel for an unreasonable amount of time. In a preferred embodiment, the threshold value is set to equal ten, indicating that no more than 10 such keep alive requests should be sent (step 274).

If the threshold has not been exceeded, step 274 sends a request to be kept alive message to the non-responding controller 126–130. In one embodiment, a request to be kept alive message is a controller-to-controller message 146 (FIG. 4), with: (a) message type 148 equal a unique value indicating that this controller-to-controller message 146 is a request to be kept alive message; (b) controller ID 150 is this controller's 126–130 ID (any remaining structural elements 152–158 are not used).

In response to receiving a request to be kept alive message, the receiving controller 126–130 will change the sending controller's 126–130 controller state from controller failed to controller active and will resume sending the requesting controller 126–130 ping messages.

At step 268, it having been determined that the non-responding controller 126–130 does not consider the sending controller 126–130 to have failed (step 266), the sending controller 126–130 resets the non-responding controller 126–130, using procedures described in greater detail above.

In one embodiment, a controller 126–130 keeps a respective ping failed counter (not shown) for each other respective controller 126–130 represented in the controller's 126–130 controller table 180 (see FIG. 5). The ping failed counter can be maintained in a memory 296 (see FIG. 3)). In this embodiment, each respective ping failed counter is incremented by one each time that a respective controller 126–130 fails to respond to a ping message. If the ping failed counter exceeds a predetermined threshold, the non-responding controller 126–130 is reset, using procedures described in greater detail above.

In one embodiment, the predetermined threshold is set to equal a value such that a non-responding controller 126–130 has plenty of opportunity to respond to a ping message. In a preferred embodiment, the threshold value is set to equal twenty (20), representing a controller 126–130 failing to respond to 20 ping messages before being reset.

D. Exemplary Software Data Structure Architecture

To provide a controller 126–130 the ability to detect the failure of more than just a single partner controller 126–130, each controller 126–130 maintains one or more data structures in memory 296 (see FIG. 3). We now describe an exemplary set of data structures used by each controller 126–130 to provide the above described structural elements of a controller table 180 and its constituent controller profile data structure(s) 182-X (see FIGS. 3–4).

Each of the following data structures are described in pseudocode. The pseudocode used is, essentially, a computer program language using universal computer program language conventions. While the pseudocode employed here has been adopted solely for the purposes of this description, it is readily understandable by any computer programmer skilled in the art.

Referring to Table 1 there is shown pseudocode for a channel state (ChannelState) data struction 1000, according to one embodiment of the present invention.

TABLE 1

ChannelState Data Structure 1000

```
typedef enum
{
    CHN_DATA_PING,
    CHN_NOT_PRESENT
} ChannelState;
```

Channel state 1000 corresponds to channel state 196-X (see FIG. 6), and includes, for example, the following structural elements:

Channel data ping (CHN_DATA_PING) is used by controller 126–130 to indicate that a channel can be used for sending and receiving controller-to-controller messages 146, and data packets, for example, SCSI data packets.

Channel not present (CHN_NOT_PRESENT) is used by controller 126–130 to indicate that a channel is either not present, or that it has been disconnected.

Referring to Table 2, there is shown controller connections (ControllerConnections) data structure 2000, according to one embodiment of the present invention.

TABLE 2

Controller Connections Data Structure 2000

```
typedef struct
{
    U32 devID;
    ChannelState state;
} ControllerConnections;
```

Controller connections 2000 corresponds to controller connections 1941-1 (see FIG. 6), and includes, for example, the following structural elements:

Device ID (devID) is used by a controller 126–130 to store a unique device identification of another controller 126–130 to be used by the controller 126–130 in controller-to-controller communications. In one embodiment, device ID is a value determined by the particular interconnect protocols, for example SCSI protocol, or fibre channel protocol, being used. For example, for a SCSI protocol, device ID may be a SCSI ID, and for a fibre protocol, device ID may be a loop ID.

Channel state (ChannelState) is an instance of channel state data structure 1000, as described in greater detail above in reference to table 1.

Referring to Table 3, there is shown aspects of controller state (ControllerState) data structure 3000, according to one embodiment of the present invention.

TABLE 3

ControllerState Data Structure 3000

```
typedef enum
{
    CONTROLLER_ACTIVE,
    CONTROLLER_FAILED,
    CONTROLLER_KILLED,
    CONTROLLER_BOOTING
} ControllerState:
```

Controller state 3000 corresponds to controller state 202-X (see FIG. 6), and includes, for example, the following structural elements, each of which is used as described in greater detail below in reference to FIGS. 5–6, and 8–11:

Controller active state (CONTROLLER_ACTIVE) means that a controller 126–130 is capable of: (a) managing a data storage system in n-way active configuration; (b) sending and receiving controller-to-controller messages 146 (FIG. 7), such as, for example, ping messages, from other controllers 126–130; and, (c) processing I/O requests from a host computer.

Controller failed state (CONTROLLER_FAILED) means that a particular controller 126–130 is not responding to controller-to-controller messages 146 within a first predetermined amount of time from the time that a controller-to-controller 146 message was sent to the particular controller 126–130.

Controller killed state (CONTROLLER_KILLED) indicates that a first controller 126–130 has determined that a second controller 126–130 had failed. In response to making this determination (as discussed in greater detail above), the first controller sends a kill controller message to each of the other active controllers 126–130, causing each respective other active controller to indicate in an associated controller state 202-X data structure, that the second controller is being killed (a controller killed state). Receipt of a kill controller message also causes a controller 126–130 to stop sending ping messages to the killed (failed) controller 126–130.

Controller booting state (CONTROLLER_BOOTING) indicates to other controllers 126–130 that the indicated controller 126–130 is booting, but not yet capable of processing host computer I/O requests, or managing the data storage system in active configuration yet.

Referring to Table 4, there is shown an example of a controller profile information data structure 4000, according to one embodiment of the present invention.

TABLE 4

Controller Profile Information Data Structure 4000.

```
typedef struct
{
    U32 controllerID;
    ControllerConnections cntrlCncts [MAX_CHANNELS];
    U64 pingSentTime;
    U64 pingRecvTime;
    ControllerState state;
    U32 linkToNextCntrlrAliveInfo;
} ControllerProfileInfo;
```

Controller profile information 4000 corresponds to CP 182-X (see FIG. 6), and includes, for example, the following structural elements:

Controller ID (controllerID) corresponds to controller identification, as discussed in greater detail above in reference to FIG. 6. In one embodiment, each controller 126–130 has a controller ID that is a unique 32-bit unsigned integer value based on, for example, a Media Access Control (MAC) address scheme used in networking. Such MAC address schemes are known.

Controller connections (cntrlCncts) is an array of controller connections data structures 2000 (described in greater detail above, see Table 2). Controller connections corresponds to controller connections 194-X, as discussed in greater detail above in reference to FIG. 6. The number of channels determines the number of elements in controller connections.

Ping message sent time (pingSentTime) corresponds to ping msg sent 198-X, as discussed in greater detail above in reference to FIG. 6. In one embodiment, ping message sent time is a 64-bit unsigned integer.

Ping message received time (pingRecvTime) corresponds to ping msg received 200-X, as discussed in greater detail above in reference to FIG. 6. In one embodiment, ping message received time is a 64-bit unsigned integer.

State (state) is a controller state data structure 3000 (ControllerState) corresponds to controller state 202-X, as discussed in greater detail above in reference to FIG. 6.

Link (link) corresponds to link 184-X , as discussed in greater detail above in reference to FIG. 6.

It can be appreciated that although these exemplary data structures are illustrated with certain structural elements, other structural elements could be used as long as the above noted certain information or equivalent information is represented. Additionally, even the data structures themselves could be replaced with more, or fewer data structures as long as the high level procedures of the present invention are followed.

E. Computer Program Product

The method described herein above is amenable for execution on various types of executable mediums other than a memory device such as a random access memory 296 (see FIG. 3). Other types of executable mediums can be used, such as but not limited to, a computer readable storage medium which can be any memory device, compact disc, or floppy disk.

F. Alternative Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A method for managing a data storage system in an n-way active controller configuration, the method comprising steps of:
   maintaining, by each controller in the data storage system, a respective controller table data structure that includes a set of controller profiles, each controller profile including information associated with a respective different controller; and,
   communicating, by a controller, with each of the respective different controllers represented in the controller's respective controller table data structure, such that an interruption in the communication, between the controller and a different controller, for a first predetermined amount of time indicates to the controller that the different controller has failed and needs to be reset,
   wherein any one active controller can detect the failure of and reset more than just a single other controller in the data storage system.

2. The method of claim 1, wherein the step of maintaining comprises steps of:
   identifying, by a controller, each other active controller in the data storage system;
   creating, by the controller, a respective controller profile for each of the identified controllers; and,
   adding, by the controller, each controller profile to the controller table data structure.

3. The method of claim 2, wherein the step of communicating further comprises steps of:
   sending, by the controller, ping messages to at least a subset of each of the identified controllers;
   for each controller that was sent a ping message in the step of sending, waiting for the first predetermined amount of time from the step of sending, for a ping message response; and,
   determining that a particular controller has failed upon failing to receive a ping message response from the particular controller withing the first predetermined amount of time from the step of sending the particular controller the ping message; and,
   the method further comprising a step of resetting a failed controller.

4. The method of claim 2, after the step of adding, further comprising a step of posting, by a booting controller, a booting controller message to at least a subset of the identified controllers, the booting controller message indicating to each controller that receives the booting controller message, that the booting controller is capable of responding to controller-to-controller messages sent from the at least a subset of other controllers.

5. The method of claim 4, further comprising a step of:
   if after the step of posting, a second predetermined amount of time has elapsed since the controller has received a ping message from any of the at least a subset of other controllers, resetting, by the booting controller, itself.

6. The method of claim 2, wherein the step of identifying further comprises a step of receiving, by a controller, a controller booting message from a different controller.

7. The method of claim 1, wherein the step of communicating, the first predetermined amount of time is equal to at least 250 milliseconds and at most 4000 milliseconds.

8. The method of claim 5, wherein the step of resetting, the second predetermined amount of time is at least 500 milliseconds and at most 1000 milliseconds.

9. The method of claim 3, wherein the step of determining further comprises a step of directing, by the controller, each of the other active controllers to stop sending ping messages to any failed controller.

10. The method of claim 1, wherein the step of communicating further comprises a step of:
    receiving, by the controller, a ping message from another controller that indicates that the other controller believes that the controller has a controller status of failed; and,
    in response to the step of receiving, requesting, by the controller, to be kept alive.

11. The method of claim 1, wherein the step of resetting, a detected failed controller is only reset it has been detected to have failed a predetermined threshold number of times.

12. The method of claim 1, wherein each controller is a RAID controller.

13. An apparatus for managing a data storage system in an n-way active controller configuration, the apparatus comprising:
    a memory having a data structure and a first procedure stored therein, the data structure including a controller table for storing one or more controller profiles, each controller profile containing information associated with a particular one of other external controllers, the first procedure using the information to identify any of the other external controllers that have failed by sending each of the other external controllers a ping message, the first procedure resetting any of the other external controllers that do not respond to the ping message within a first predetermined amount of time from the time that the ping message was sent; and,
    a processing unit coupled to the memory, for executing the first procedure.

14. The apparatus of claim 13, wherein the first procedure detects any of the other external controllers that have failed by sending a separate ping message to each of the other external controllers, and resetting any of the other external controllers that do not respond to the separate ping message within the first predetermined amount of time from the time that the separate ping message was sent.

15. The apparatus of claim 13, wherein the apparatus is a RAID controller.

16. The apparatus of claim 13, wherein the first procedure detects the failure of the apparatus by starting a watchdog timer upon booting-up, initializing the watchdog timer to zero any time that a ping message is received by the apparatus from any other external controller, and resetting the apparatus upon the watchdog timer having run for a second predetermined amount of time without being initialized.

17. The apparatus of claim 13, wherein the first predetermined amount of time is at least 50 milliseconds and at most 4000 milliseconds.

18. The apparatus of claim 13, wherein the first predetermined amount of time is equal 250 milliseconds.

19. The apparatus of claim 17, wherein the second predetermined amount of time is equal at least 500 milliseconds and at most 4000 milliseconds.

20. The apparatus of claim 17, wherein the second predetermined amount of time is equal 1000 milliseconds.

21. The apparatus of claim 13, wherein the controller table is a linked list of controller profile information data structures, each controller alive info data structure including a particular controller's unique ID, an array of controller connections, for identifying each communication channel connected to the particular controller, a ping sent time, for indicating a first timestamp of when a last ping message was sent to the particular controller, a ping received time, for indicating a second timestamp of when a last ping message was received from the particular controller, and an indication of the particular controller's state, for indicating whether the particular controller is alive or failed.

22. The apparatus of claim 13, wherein the procedure, upon resetting a particular other controller, ensures that the particular other controller is reset, by sending each other external controller a controller-to-controller message that directs each receiving controller to stop sending the particular other controller ping messages, whereby the particular other controller, after not receiving a ping message from any other controller for a second predetermined amount of time, resets itself.

23. A computer program product for use in conjunction with a processor to manage a data storage system in an n-way active controller configuration, the computer program product comprising a computer readable storage medium and a computer program mechanism embedded therein, the computer program mechanism, comprising an n-way ping procedure, the n-way ping procedure including instructions for:

maintaining, by each active controller of a plurality of controllers, a respective controller table data structure that contains a respective controller profile for at least a subset of each other active controller in the data storage system; and, managing, by a controller, the data storage system with each of the other active controllers that are identified in the controller's table data structure, wherein the instructions of managing further comprise instructions for:

detecting, by the controller, the failure of any controller identified in the controller's respective controller table data structure; and, resetting, by the controller, any detected failed controller, whereby each active controller in the data storage system manages the data storage system in an n-way active controller configuration, and wherein any one active controller can detect the failure of and reset more than just a single other controller in the data storage system.

24. The computer program product of claim 23, wherein the instructions for maintaining comprise steps of:

identifying, by a controller, each other active controller in the data storage system;

creating, by the controller, a respective controller profile for each of the identified controllers; and, adding, by the controller, each controller profile to the controller table data structure.

25. The computer program product of claim 23, wherein the instructions for managing further comprise instructions for:

sending, by the controller, ping messages to at least a subset of each of the identified controllers;

for each controller that was sent a ping message in the instructions for sending, waiting for a first predetermined amount of time from the instructions for sending, for a ping message response; and, determining that a particular controller has failed upon failing to receive a ping message response from the particular controller withing the first predetermined amount of time from the instructions for sending the particular controller the ping message.

26. The computer program product of claim 25, after the instructions for adding, further comprising an instruction for posting, by a booting controller, a booting controller message to at least a subset of the identified controllers, the booting controller message indicating to each controller that receives the booting controller message, that the booting controller is capable of responding to controller-to-controller messages sent from the at least a subset of other controllers.

27. The computer program product of claim 26, further comprising instructions for:

if after the step of posting, a second predetermined amount of time has elapsed since the controller has received aping message from any of the at least a subset of other controllers, resetting itself, by the booting controller.

28. The computer program product of claim 23, wherein the instructions for identifying further comprise an instruction for receiving, by a controller, a controller booting message from a different controller.

29. The computer program product of claim 25, wherein the instructions for resetting, the first predetermined amount of time is equal to at least 250 milliseconds and at most 4000 milliseconds.

30. The computer program product of claim 26, wherein the instructions for resetting, the second predetermined amount of time is at least 500 milliseconds and at most 1000 milliseconds.

31. The computer program product of claim 23, wherein the instructions for detecting further comprise an instruction for directing, by the controller, each of the controllers to stop sending ping messages to any failed controller.

32. The computer program product of claim 23, wherein the instructions for managing further comprise instructions for:

receiving, by the controller, a ping message from another controller that indicates that the other controller believes that the controller has a controller status of failed; and, in response to the step of receiving, requesting, by the controller, to be kept alive.

33. The computer program product of claim 23, wherein each controller is a RAID controller.

34. A data storage system managed by multiple controllers in n-way active configuration, the data storage system comprising:

a plurality of controllers;

a host computer; and, one or more disk storage devices, wherein, each controller is operatively coupled to a first bus and a second bus, the host computer is coupled to the first bus, the one or more disk storage devices are coupled to the second bus, each controller being adapted to transfer data between the I/O devices and the host computer in response to instructions therefrom, at least a subset of the controllers being adapted to detect the failure of one or more of the other controllers, and upon detecting, by a controller, a failed controller, the controller resetting the failed controller.

35. The data storage system of claim 34, wherein at least a subset of the plurality of controllers are RAID controllers.

* * * * *